Figure 1:
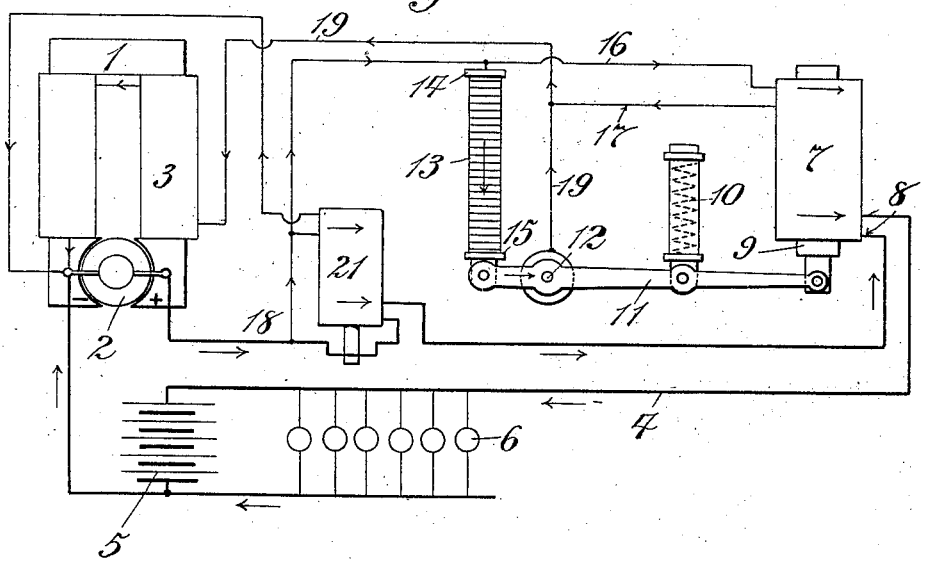

No. 760,091. PATENTED MAY 17, 1904.
M. WADDELL.
AUTOMATIC REGULATOR FOR ELECTRIC CIRCUITS.
APPLICATION FILED JUNE 18, 1903.
NO MODEL. 3 SHEETS—SHEET 1.

Witnesses
Edward Bowland
Florence Pick

Montgomery Waddell
Inventor
By his Attorney H. S. Mackay

No. 760,091. PATENTED MAY 17, 1904.
M. WADDELL.
AUTOMATIC REGULATOR FOR ELECTRIC CIRCUITS.
APPLICATION FILED JUNE 18, 1903.
NO MODEL. 3 SHEETS—SHEET 2.
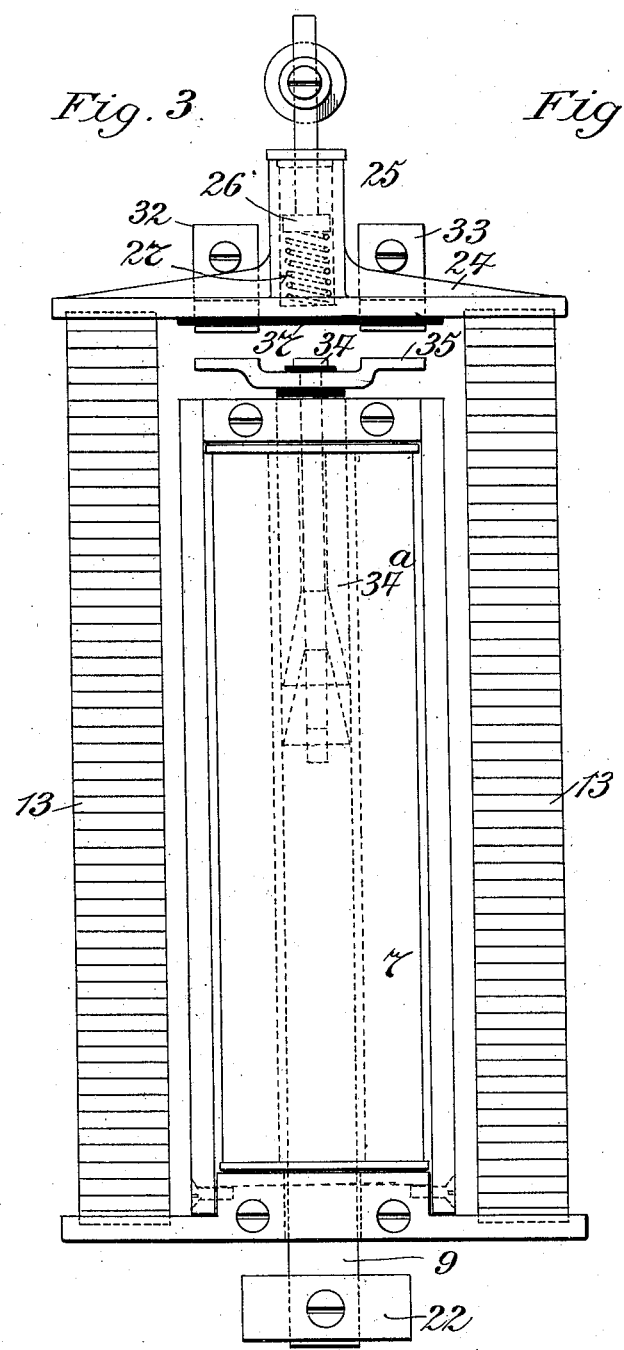
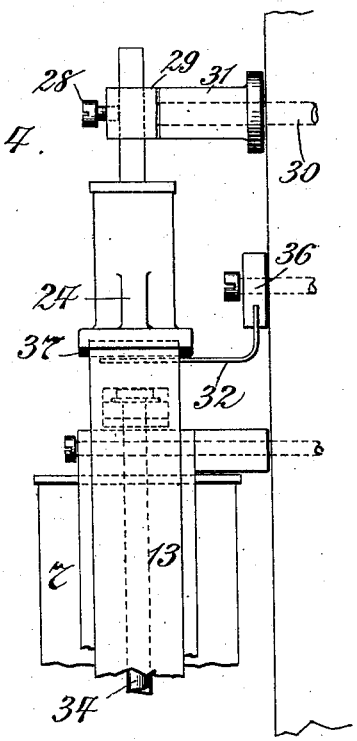
Witnesses
Edward Rowland
Florence Pick
Montgomery Waddell
Inventor
By his Attorney H. S. MacKaye No. 760,091. PATENTED MAY 17, 1904.
M. WADDELL.
AUTOMATIC REGULATOR FOR ELECTRIC CIRCUITS.
APPLICATION FILED JUNE 18, 1903.
NO MODEL. 3 SHEETS—SHEET 3.

Witnesses
Edward Rowland
Florence Pick

Montgomery Waddell
Inventor
By his Attorney H. MacKaye

No. 760,091.                                                    Patented May 17, 1904.

UNITED STATES PATENT OFFICE.

MONTGOMERY WADDELL, OF NEW YORK, N. Y.

AUTOMATIC REGULATOR FOR ELECTRIC CIRCUITS.

SPECIFICATION forming part of Letters Patent No. 760,091, dated May 17, 1904.

Application filed June 18, 1903. Serial No. 162,081. (No model.)

*To all whom it may concern:*

Be it known that I, MONTGOMERY WADDELL, a subject of the King of Great Britain, residing in the city, county, and State of New York, have invented a certain new and useful Improvement in Automatic Regulators for Electric Circuits, of which the following is a specification.

My present invention relates to an improved means for the regulation of electric circuits for the production of constant current or of constant potential, or of both, in different parts of a system supplied by one or more generators.

The invention is particularly useful in connection with dynamos used with auxiliary secondary batteries—for instance, for lighting purposes—particularly where (as in car-lighting) the dynamo is most conveniently driven at a varying rate of speed.

From one point of view this invention relates to means whereby the percentage of variation in current or potential may be made as small as practically desirable by causing incipient changes in the working circuit to produce resistance changes of large proportion in circuits so arranged with relation to the dynamo as to rapidly counterbalance the causes of such incipient change. The end thus proposed is carried out to the greatest extent in the preferred embodiment hereinafter described by causing the changes in resistance to react upon electromagnetic apparatus which causes said changes in such a manner as to emphasize or increase the operative resistance change, and thus by accelerating the regulative effect on the dynamo to increase in a high degree the sensitiveness of the regulation.

In its preferred form this invention is adapted to be applied to those systems of distribution wherein a dynamo is assisted by a secondary battery in shunt with the translating devices, so as to better adapt the dynamo (even when running at varying speeds) to those variations in the characteristics of the battery consequent upon its progressive condition of charge. For instance, my regulator can be so proportioned as to diminish the charging-current when the battery approaches its full charge, and this in spite of the rise of voltage opposed by the battery in this condition.

Another object of my invention is the production of a simple apparatus which shall have one or all of the advantages above named and wherein the usual automatic cut-out switch is replaced by an apparatus capable of performing the functions of such switch at the proper time in addition to the regulative functions above outlined.

The invention is illustrated in the accompanying drawings, wherein—

Figure 2:
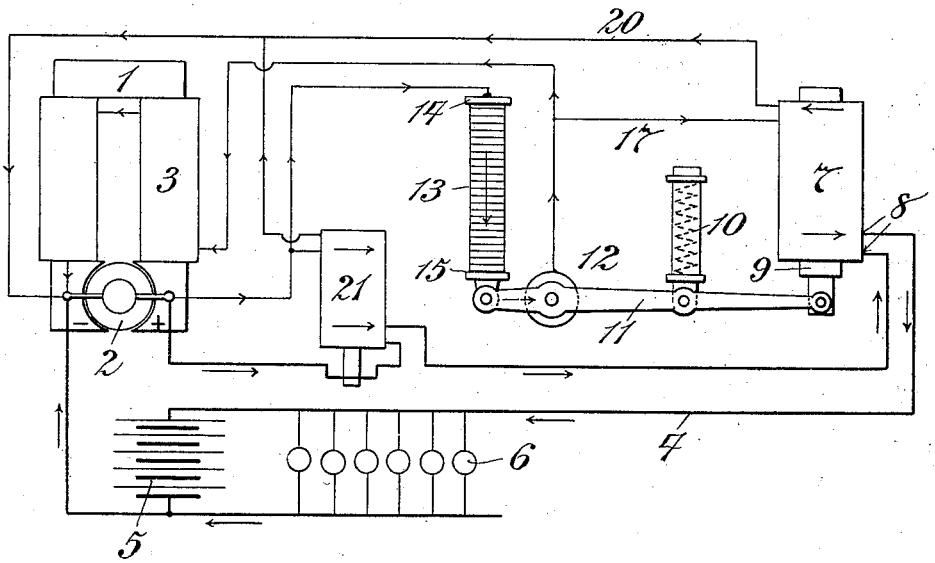
Figure 5:
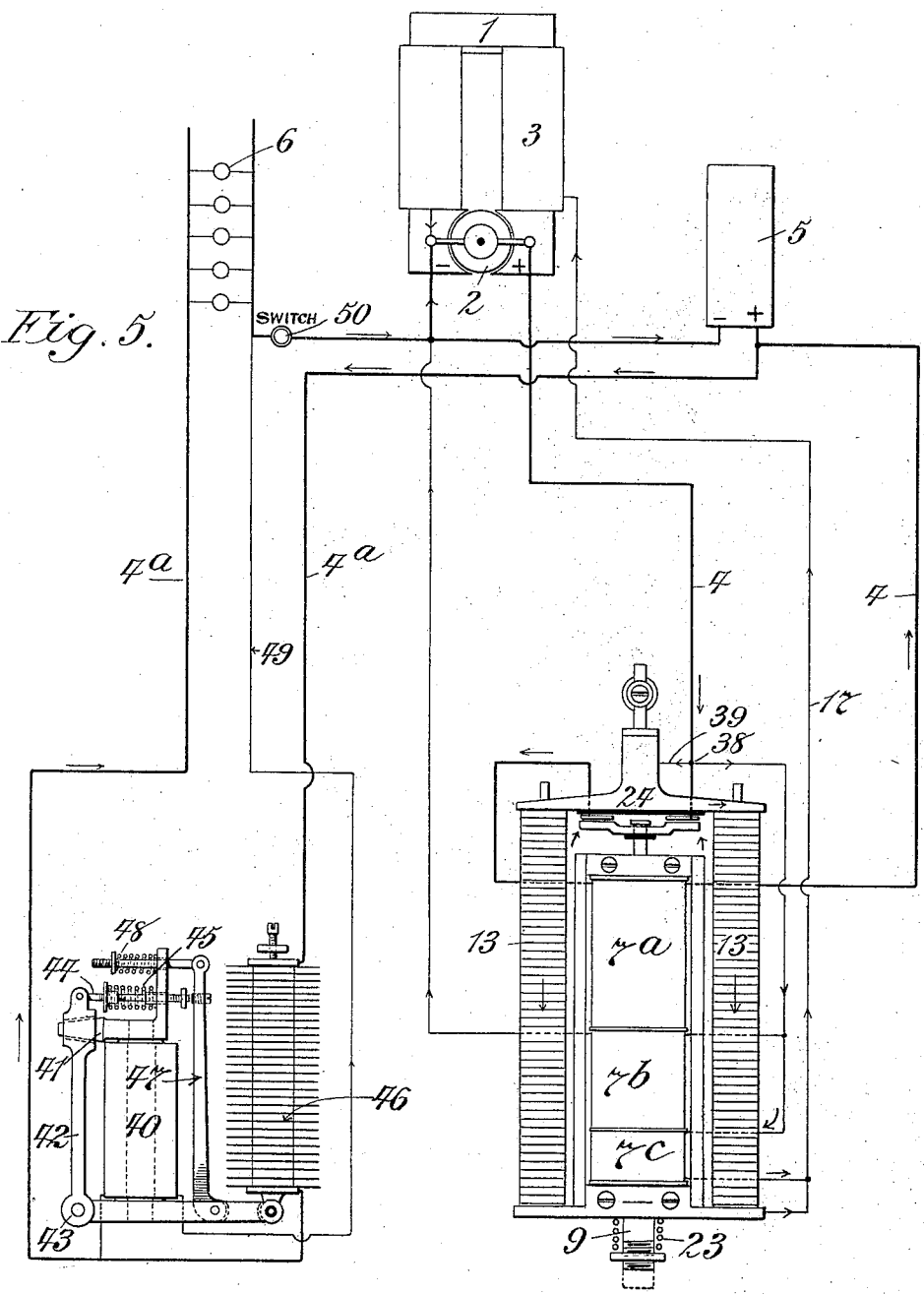

Figures 1 and 2 show in diagram certain simple forms of apparatus for the regulation of shunt-wound dynamos conforming to my invention. Fig. 3 is an elevation, and Fig. 4 is a partial side view of a preferred resistance-changer and circuit-closer combined, as used in my invention; and Fig. 5 is a diagrammatic view of an entire regulating system as employed, for instance, in car-lighting.

While in the drawings I have shown my invention applied exclusively to shunt-wound generators, it is to be understood that certain features of the invention are useful in connection with any form of dynamo or electric machine, and I am not to be limited to its application as illustrated, except where specifically so claimed.

In Fig. 1 the dynamo is shown at 1 provided with an armature 2 and a field-winding 3 in shunt with the work-circuit 4. In the forms of my invention illustrated a secondary battery 5 is shown in shunt with the translating devices 6, which latter may be of any desired character. It is to be understood, however, that I am not limited to systems wherein secondary batteries are used, except in so far as hereinafter specifically claimed.

The motive force for operation of the regulator is supplied by a solenoid 7, the primary of principal operating-coils of which are either in series with the work-circuit or in shunt therewith, or both, according to the regulative results desired. In Figs. 1 and 2 the principal coil is connected at 8 in series with the working circuit 4. The core 9 of the solenoid is mechanically connected in any desired manner, so that when operative for regulation it is opposed by an appropriate mechanical resistance, such as the spring 10 or its equivalent. As shown in Figs. 1 and 2, the core 9 is mechanically connected to the spring 10 by means of a lever 11, pivotally connected to both and having its fulcrum at 12. It is obvious that various relations of the lever and its fulcrum to the points of attachment to the spring and the core are within this invention and will occur to those skilled in the art.

As shown in Figs. 1 and 2, the electrical resistance 13 is compressed between two abutments 14 and 15, the abutment 15 being pivotally connected to the lever 11 on the opposite side of the fulcrum from the core 9. The resistance 13 may be of any well-known construction, such that changes in pressure thereon cause corresponding changes in the total resistance of the column. It is to be understood that while I have everywhere illustrated the column 13 as vertically placed, my invention includes the use of this column in any position, whether vertical, horizontal, or inclined. The spring 10 is so arranged as to exert a continual pressure upon the column 13, acting to squeeze the same between the abutments 14 and 15. It is this pressure which is opposed or counteracted to a greater or less extent by the pull on the core 9, due to the electromagnetic effect of the solenoid 7.

In Figs. 1 and 2 the resistance-column 13 is connected in series with the field-magnet winding 3, and therefore in shunt with the working circuit. This is plainly shown in these figures by the small arrow-heads applied to the fine lines representing the shunt-wires in Fig. 1, and wires 16 and 17 lead directly from the two ends of the resistance 13 and are coiled around the solenoid 7 in such a direction as to assist the pull of the series coil entering at 8. This is clearly indicated on the solenoid by the identical direction of the top and bottom arrows on said solenoid. The coil supplied by 16 and 17 will be called the "auxiliary" coil, since it aids in producing greater sensitiveness and finer regulation. This is true whether wound as in Fig. 1 or as an opposing-coil, as in Fig. 2. Following now the circuits in Fig. 1, it will be seen that current leaving the positive brush of the dynamo branches from the working circuit at 18, passes through the column 13 and out by the wire 19 to that extremity or terminal of the field-magnet winding which is not directly connected to the armature-brush. At the same time a portion of this current is diverted through the wires 16 and 17 into the auxiliary coil. It is evident that the amount of current so diverted into the auxiliary coil will be greater in proportion as the resistance of the column 13 is greater. By suitably proportioning the number of turns in the auxiliary coil with relation to the normal current and the number of turns in the main coil entering at 8 on the solenoid a relatively small current in the auxiliary coil can be given almost any desired proportion of the work of regulation, and consequently small current changes in the auxiliary coil may be made to produce relatively large differences in the ampere-turns effectively applied to the core 9.

The arrangement shown in Fig. 1 is suitable for those cases wherein translating devices 6 are operated by a dynamo 1, which is driven at varying rates of speed—as, for instance, where the dynamo is driven by the axle of a car for lighting the same. It is desirable in a system of this kind that a practically constant current should be employed for charging the battery 5, and in producing the regulation necessary to this end my device acts as follows: Assuming the speed of the dynamo to rise slightly, the incipient increase of current, due primarily to this rise, causes increased effect on the core 9, and thus decreases the compressive action of the spring 10 on the column 13. This increases the resistance of the column and tends to weaken the field-magnet. At the same time this very increase of resistance sends more current through the auxiliary coil, which assisting the series coil still further increases the resistance at 13. As the field-magnet decreases in strength the effect of the series coil is lessened, and this decrease in effect of the series coil, together with increase of effect in the auxiliary coil, is continued until (a constant new speed of dynamo being reached) a balance is found in the regulator corresponding to just enough rise of current in the coils of the solenoid in maintaining the weakening effect on the field-magnets. It is obvious from what has been stated that the necessary rise in the working current is small in proportion as the auxiliary coil is made effective in the increasing of the resistance at 13. It is thus that the auxiliary coil increases the sensitiveness of the regulation.

In Fig. 2 is shown a modification wherein the auxiliary coil, while it is connected on one side to one end of the column 13, is connected on the other side by the wire 20 directly to the negative brush of the dynamo. The auxiliary coil in this case is connected in shunt around the field-winding instead of being placed in shunt around the resistance 13. Since both the field-magnet and the auxiliary coil, in the form shown in Fig. 2, are in series with the resistance 13, it is clear that as the resistance 13 increases the auxiliary coil takes less current. For this reason the auxiliary coil, in the form shown in Fig. 2, must be so wound as to oppose the main or series coil. This is indicated on the drawings by the opposed direction given to the upper and lower arrows on the solenoid 7. The form shown in Fig. 1 is preferred.

At 21 in Figs. 1 and 2 is shown the well-known circuit-closing solenoid, which insures the closing of the main circuit at the proper time and the opening thereof when the dynamo slows down sufficiently to allow of reverse current in the dynamo-circuit due to the action of the battery 5. I have found that the functions of this last-named device can be advantageously combined with a still further improved form of regulator, and I have shown means for this purpose in Figs. 3, 4, and 5.

It is obvious that as a dynamo is started up from a state of rest there will be a considerable interval of time during which the current and potential will be far below this normal average condition. It is desirable that during this interval the regulator which I have described should be inactive so far as changes in the resistance-column 13 are concerned. This is clear from the fact that the degree of useful variation in resistance in any column of this character is limited, and it is therefore most expedient to utilize the total variation in resistance over only the average working conditions of the system. From this purpose I have devised a modification of my regulator wherein the variations in pressure on the resistance-column do not come into play until there has been developed in the circuits to be controlled a potential approximating normal conditions. One form of regulator for this purpose is shown in Figs. 3 and 4, wherein the solenoid 3 operates upon the core 9, inward movement of which is opposed by an appropriate mechanical resistance, such as the weight 22 or the spring 23 in Fig. 5. By using such a mechanical resistance it is clear that the solenoid does not move inward until a sufficient current is supplied to the solenoid to overcome such resistance.

The resistance-columns 13 are preferably located on the two sides of the solenoid, and the pressure-yoke 24 bears on the top of each of these columns. The yoke 24 is supplied with a hollow sleeve 25, into which is loosely fitted the plunger 26, bearing on a spring 27. The plunger 26 is held fast by a set-screw 28 in a socket 29, which socket is attached to a swivel-pin 30, fitting in the socket 31. This construction permits of a certain amount of pivotal play to allow for slight variations in the total height of the two columns 13. Associated with the yoke 24 are two terminals 32 and 33 for closing the series circuit of the solenoid, as more clearly shown in Fig. 5. A ram or plunger 34 passes downward with a loose fit through the pole-piece $34^a$ and is attached to the top of the core 9. The bridging-piece, of metal, 35 is carried upon and insulated from said ram, as shown. The top of the core 9 is best made conical, as shown in dotted lines in Fig. 3, and the pole-piece $34^a$ is also conically hollowed, as shown. This lessens the difference in magnetic effect, due to approach of the core and pole-piece. When the solenoid is energized by a sufficient current, the weight 22 or spring 23 is overcome, and the core 9 moves inward, so as to bring the bridging-piece 35 upward into contact with the terminals 32 and 33. These terminals may be associated in any practical manner with the yoke 24, and in the form shown they comprise the flexible metallic plates fastened, as at 36, behind the yoke 24 and extending forward in a horizontal position beneath the insulating-plate 37 under said yoke. In this construction the bridging-piece 35 first closes circuit and then immediately begins to exert upward pressure on the yoke 24 against the spring 27, thus tending to increase the resistance in the columns 13. As applied in its preferred form the last-described apparatus is used as shown in Fig. 5, wherein the dynamo is shown at 1, the secondary battery at 5, and the solenoid is composed of three coils $7^a$, $7^b$, and $7^c$. The coil $7^a$, which may conveniently represent about half of the ampere-turns on the solenoid, is in series with the working circuit 4. The coil $7^b$, which may comprise about one-third of all the ampere-turns, is in shunt with the circuit between the negative brush and the point 38. The coil $7^c$ is in shunt around the resistances 13, these resistances being brought in circuit through the yoke 24, connected to 38 by the wire 39. While the coil $7^c$ is in shunt with the resistances, these resistances are themselves in series with the field-magnet winding, being connected thereto by the wire 17.

The arrangement thus far described with relation to Fig. 5 will be seen to comprise a combination of what is shown in Fig. 1 and what is shown in Figs. 3 and 4, with this modification, that the coil $7^b$ is added, which is in shunt with the working circuit. The normal office of the coil $7^b$ is to close the working circuit and to provide a continual force thereafter in the same direction as that exerted by the coil $7^a$, which force is increased with the voltage supplied by the battery 5.

That portion of the entire system illustrated in Fig. 5 which has thus far been described constitutes in itself a useful regulated system of electrical distribution. While illustrated in connection with a battery and a magneto-electric generator in multiple arc, it is clear that it is applicable to a magneto-electric generator alone or to multiple-arc combinations of generators one or more of which are magneto-electric.

It is desirable in many instances that the system so far described should be employed for the operation of translating devices 6, designed for constant-potential circuits. In order that this combination may be made effective, I prefer to supply the additional regulating means shown in Fig. 5. In this latter regulator the magnet 40, having a pole-piece 41, operates on an armature 42, pivoted at 43 and operating a plunger 44, which works against a spring 45. The resistance-column 46, shown made in accordance with the hereinafter-described mode of construction, is kept constantly under pressure by means of a lever 47, kept under the influence of a spring 48. It will be seen that after the magnet 40 reaches a predetermined strength sufficient to overcome the spring 45 the plunger 44 will impinge upon the lever 47 and begin to counteract the effort of the spring 48, thus proportionally increasing the resistance in the column 46. Thus it is shown that the principle of the use of two mechanical resistances opposing the solenoid hitherto described may be embodied in connection with a leverage system. The column 46 is in series with that part of the working circuit 4ᵃ which leads directly to the translating devices 6. The magnet 40 is in shunt with this working circuit, being connected with a wire 49, leading out of the working circuit beyond the switch 50. It will thus be seen that the power of the magnet 40 is governed by the potential existing across the translating devices in multiple arc. As one or more of these translating devices is cut out the resistance of the remainder increases and a larger volume of current passes through the magnet 40. This causes a stronger attraction of the armature 42 and increases the resistance at 46, thus decreasing the current in proportion to decreased call for current due to cutting out of translating devices.

The various parts of my invention are susceptible of many modifications in detail without departing from the scope of the invention, and I am not to be understood as limiting myself to the exact structure herein shown and described.

What I claim is—

1. In combination with a shunt-wound generator, a variable-resistance device in series with the field-magnet winding, electromagnetic means for controlling said resistance, a coil on said electromagnetic means in series with the working circuit of the generator and a second coil on said means connected on one side to said working circuit and on the other side to the field-magnet windings between said windings and said variable resistance, substantially as described.

2. In combination with a shunt-wound generator, a column of conducting-bodies in series with the field-magnet winding of the generator, means for exerting pressure on said column, electromagnetic means for controlling the pressure so exerted, a coil on said electromagnetic means in series with the working circuit of the generator and a second coil on said means connected on one side to said working circuit and on the other side to the field-magnet winding between said winding and the variable resistance, substantially as described.

3. In combination with a shunt-wound generator, a column of conducting-bodies in series with the field-magnet winding of the generator and electromagnetic means for controlling the degree of mutual pressure between said conducting-bodies, said means comprising a coil in series with the working circuit of the generator and a second coil connected on one side to said working circuit and on the other side to the field-magnet winding between said winding and the variable resistance, substantially as described.

4. In combination with a shunt-wound generator, a variable-resistance device in series with the field-magnet windings, electromagnetic means for controlling said resistance, a coil on said electromagnetic means in series with the working circuit of the generator and a second coil on said means having its two ends connected respectively to the two extremities of the variable resistance, substantially as described.

5. In automatic means for regulating electric circuits, an electrical resistance controllable by variations in pressure and an electromagnetic device for causing changes in pressure on said resistance, said device comprising a primary mechanical resistance, a secondary mechanical resistance exerting pressure on said electric resistance and a movable member all so arranged that progressive movement of the movable member is opposed by said primary and secondary mechanical resistances successively, substantially as described.

6. In automatic means for regulating electric circuits, an electrical resistance controllable by variations in pressure, an electromagnetic coil and armature, a spring for opposing initial operative relative movement between said coil and armature and a second spring exerting pressure on said electrical resistance and so placed that said pressure is opposed by said coil and armature during the latter part of said relative movement, substantially as described.

7. In an automatic means for regulating electric circuits, an electrical resistance controllable by variations in pressure, a pressure device bearing thereon, two electromagnetic coils, a movable armature and circuit-closing means for one of said coils in the path of movement of said armature, all so arranged that as the armature moves under the influence of one of said coils, it first closes circuit through the other coil by contact with said means and then exerts an effort in opposition to said pressure device, substantially as described.

8. In an automatic means for regulating electric circuits, an electrical resistance controllable by variations in pressure, a pressure device bearing thereon and an electromagnetic device for controlling the pressure on said resistance, said device comprising two coils, a movable armature and circuit-closing means for one of said coils in the path of movement of said armature, all so arranged that, as the armature moves under the influence of one of said coils, it first closes circuit through the other coil by contact with said terminals and then exerts an effort in opposition to said pressure device, substantially as described.

9. In an automatic means for regulating electric circuits, an electrical resistance controllable by variations in pressure, a pressure device bearing thereon, two electromagnetic coils, a movable armature, means tending to oppose initial motion of said armature, and circuit-closing terminals for one of said coils in the path of movement of said armature all so arranged that, as the armature moves under the influence of one of said coils, it first overcomes said initial opposing means, then closes circuit through the other coil by contact with said terminals and lastly exerts an effort in opposition to said pressure device, substantially as described.

10. In an automatic means for regulating electric circuits, an electrical resistance controllable by variations in pressure and an electromagnetic device for controlling the pressure on said resistance, said device comprising a closed circuit-coil and an open circuit-coil, a movable armature, means tending to oppose initial motion of said armature and circuit closing terminals for said open circuit-coil in the path of movement of said armature all so arranged that, before the moving armature reaches operative position for control of said pressure, it first overcomes said initial opposing means and then closes circuit through the open circuit-coil by contact with said terminals, substantially as described.

11. A shunt-wound generator, a regulating-coil in series with the working circuit thereof, a second coil in shunt with said working circuit, an armature influenced by both of said coils, a variable electrical resistance capable of variation by pressure normally in circuit with the generator, a pressure device bearing thereon and terminals for closing said series circuit-coil in the path of movement of said armature, all so arranged that the first movement of the armature closes the working circuit and brings the armature into position to exert action upon said pressure device in opposition thereto, substantially as described.

12. A shunt-wound generator, a regulating-coil in shunt with the working circuit thereof, circuit-closing means for said working circuit and a variable resistance in circuit with the generator for its regulation; in combination with an armature operated by said shunt-coil and means connected to said armature adapted to successively operate said circuit-closing means and produce changes in said variable resistance, substantially as described.

13. A shunt-wound generator, a regulating-coil in series with the working circuit thereof, a second coil in shunt with said working circuit, a variable electrical resistance capable of variation by pressure, normally in circuit with said generator, a third coil in shunt around said resistance, an armature influenced by all three of said coils, a pressure device for said resistance and terminals for closing the working circuit, all so arranged that the first movement of the armature closes the working circuit and brings the armature into position to exert an opposing action upon said pressure device, substantially as described.

14. A shunt-wound generator, a regulating-coil in series with the working circuit thereof, a second coil in shunt with said working circuit, a variable electrical resistance capable of variation by pressure, normally in circuit with said generator, a third coil in shunt around said resistance, an armature for governing said resistance influenced by all three of said coils and terminals for closing the working circuit, all so arranged that, before the moving armature reaches operative position for governing said resistance, it first closes the working circuit, substantially as described.

15. A shunt-wound generator, a variable electrical resistance-column capable of variation by pressure, a compression-bar at one end of said resistance-column and a solenoid beside said resistance comprising three coils, the first coil being in series with the working circuit of the generator, the second coil being in shunt therewith and the third coil being in shunt across the ends of said resistance; in combination with a solenoid-core within said coils adapted to bear against said compression-bar and circuit-closing terminals in the path of movement of the core arranged to coöperate with said solenoid-core for closing said working circuit, substantially as described.

16. Two generators in parallel on a common work-circuit, one of which is magneto-electric and shunt-wound, a regulating-coil in shunt with the working circuit, circuit-closing means for said working circuit and a variable resistance in circuit with the magneto-electric generator; in combination with an armature operated by said shunt-coil and means connected with said armature adapted to successively operate said circuit-closing means and produce changes in said variable resistance, substantially as described.

17. In combination with a shunt-wound generator, a working circuit therefor and a secondary battery connected across said working circuit; a variable-resistance device in series with the field-magnet windings, electromagnetic means for controlling said resistance, a coil on said electromagnetic means in series with the working circuit and a second coil on said means connected on one side to the working circuit and on the other side to the field-magnet winding between said winding and the variable resistance, substantially as described.

18. In combination with a shunt-wound generator, a working circuit therefor and a secondary battery connected across said working circuit; a column of conducting-bodies in series with the field-magnet windings of the generator, means for exerting pressure on said column, electromagnetic means for controlling the pressure so exerted, a coil on said electromagnetic means in series with said working circuit and a second coil on said means connected on one side to the working circuit and on the other side to one of the field-magnet terminals between the field-magnet and said conducting-bodies, substantially as described.

19. In combination with a shunt-wound generator, a working circuit therefor and a secondary battery connected across said working circuit; a variable-resistance device in series with the field-magnet windings, electromagnetic means for controlling said resistance, a coil on said electromagnetic means in series with the working circuit of the generator and a second coil on said means having its two ends connected respectively to the two extremities of the variable resistance, substantially as described.

MONTGOMERY WADDELL.

Witnesses:
H. S. MACKAYE,
FLORENCE PICK.